July 31, 1956  H. H. EICHORST  2,756,808
PORTABLE HEAD AND BACK REST
Filed Dec. 15, 1953

Herman H. Eichorst
INVENTOR.

BY *Clarence A. O'Brien*
*and Harvey B. Jackson*
Attorneys

2,756,808
PORTABLE HEAD AND BACK REST
Herman H. Eichorst, Hollydale, Calif.

Application December 15, 1953, Serial No. 398,348

2 Claims. (Cl. 155—174)

The present invention relates to new and useful improvements in portable head and back rests for use on vehicles or chairs, particularly the former, and has for its primary object to provide, in a manner as hereinafter set forth, a self-adjusting shock absorbing device of this character which is adapted to be firmly but removably held in position on substantially all makes or models of cars without the use of straps or other extraneous securing means.

Another very important object of the invention is to provide a portable, self-adjusting combination head and back rest of the aforementioned character comprising a seat pad or cushion which is also adapted to be used as a support of the small of the back, thereby promoting comfort.

Other objects of the invention are to provide a portable head and back rest of the character described which will be comparatively simple in construction, strong, durable, compact, light in weight, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 2:
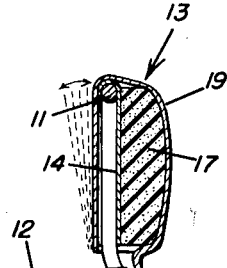
Figure 2 is a view in vertical section, showing the device in position for use, taken substantially on the line 2—2 of Figure 1.
Figure 2:
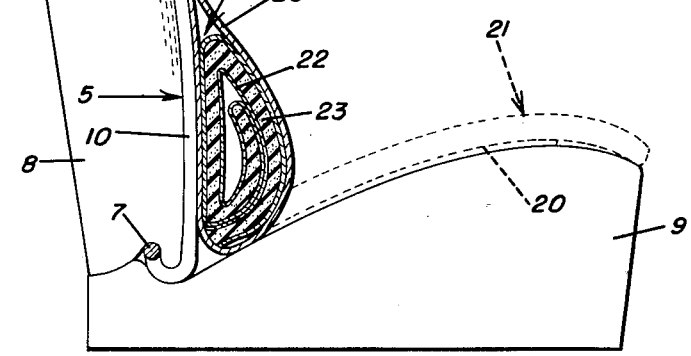
Figure 4:
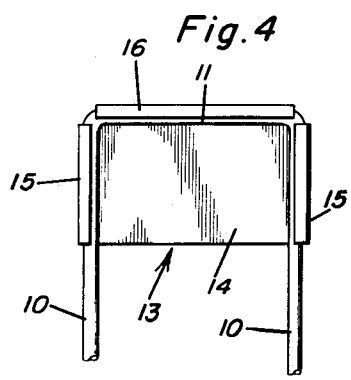
Figure 4 is a view in rear elevation of the upper portion of the frame with the removable head rest thereon.
Figure 3:
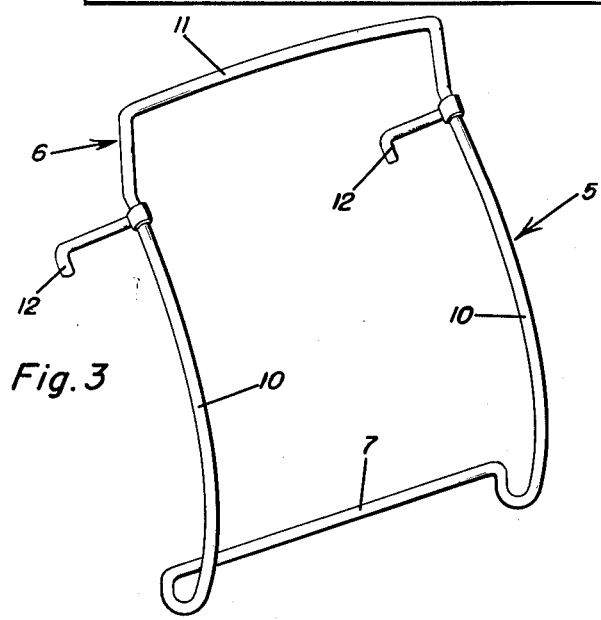
Figure 3 is a perspective view of the resilient metallic frame with the clamping hooks slidable thereon.

Referring now to the drawing in detail, it will be seen that the embodiment of the invention which has been illustrated comprises a generally substantially rectangular frame 5 which is formed from a single length of suitable resilient metal. The upper portion of the frame 5 is forwardly angled, as at 6. The lower end portion of the frame 5 is reversely bent rearwardly and upwardly to provide a hook 7 which is engageable under the lower portion of the cushion of the back 8 of a vehicle seat 9 in the manner shown to advantage in Figure 2 of the drawing. The side rods 10 of the frame 5 are curved as shown to conform substantially to the curvature of the front of the cushion of the seat back 8 against which said said rods rest. The upper ends of the side rods 10 are connected by a cross member 11.

It is to be noted that the frame 5 is of a length to extend a substantial distance above the seat back 8.

Mounted for sliding adjustment on the upper portions of the side rods 10, adjacent the forwardly angled upper portion 6 of the frame 5, is a pair of clamping hooks 12 which are engageable over the top of the seat back 8 for coaction with the hooks 7 for firmly but removably securing said frame in position on said seat back.

Removably mounted on the upper portion 6 of the frame 5 is a head support 13. The head support 13 comprises a metallic plate 14 including side vertical marginal flanges 15 which slidably receive the rods 10 of the frame 5. The plate 14 further includes a horizontal upper marginal rolled flange 16 for the reception of the member 11 of the frame 5. Adhesively or otherwise secured on the front of the plate 14 is a cushion 17 of foam, sponge rubber or other suitable material.

Removably mounted on the frame 5 is a slip cover 18 of suitable flexible material. The slip cover 18 includes on its upper end an inverted pocket 19 of a size and shape to accommodate the head support 13.

The slip cover 18 further includes, on its lower end, a flap 20 which, when in one position, is adapted to overlie the seat 9. Also extending from the lower portion of the slip cover 18 is a pad 21 which, when in one position, is adapted to overlie the flap 20 and the front portion of the seat 9. The pad 21 includes a pocket 22 which encloses a filler 23 of foam rubber or other suitable material.

Figure 1:
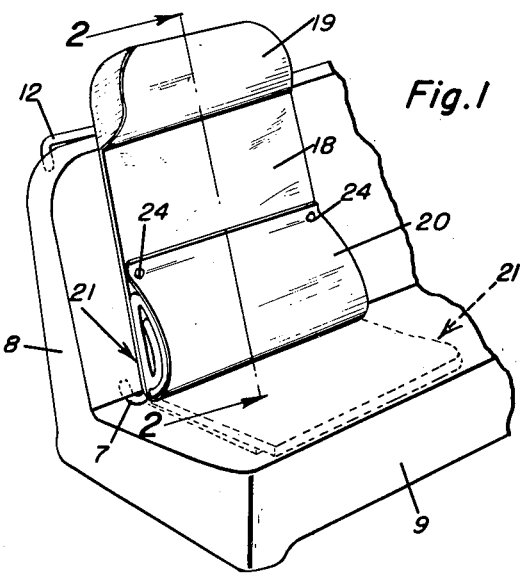
Figure 1 is a perspective view, showing a portable head and back rest constructed in accordance with the present invention mounted on an automobile seat.

It is thought that the use of the device will be readily apparent from a consideration of the foregoing. Briefly, the hook 7 of the frame 5 is engaged beneath the bottom of the cushion of the seat back 8 and clamping hooks 12 are engaged over the top of said seat back for firmly securing said frame in position. The cover 18 depends from the head support 13 and rests against the seat back between the rods 10 of the frame 5. The pad 21 extends forwardly from the lower end of the cover 18 and rests on the seat 9 with the flap 20 therebetween. With the pad 21 thus positioned the user sits thereon with his back against the cover 18 and the rest 13 serves as a support for the head. As indicated in broken lines in Figure 2 of the drawing, the resiliency of the frame 5 makes it self adjusting. Also, the frame 5 is of a width to accommodate the user's back between the side rods 10 thereby utilizing the weight of the body on the cover 18 to anchor the device in position and to permit further self adjustment. If a support for the small of the back is desired, the pad 21 is rolled in the manner shown in Figures 1 and 2 of the drawing and secured by the flap 20, the free end portion of which is detachably secured at 24 to the cover 18.

It is believed that the many advantages of a portable head and back rest constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A head and back rest comprising: a frame, means for securing said frame on the back of a seat, a head support mounted on the frame, a slip cover mounted on said frame, a rollable pad on the lower portion of the slip cover adapted to rest on the seat, and a flap on the lower end portion of the cover underlying the pad and being detachably connectable at its free end to the cover at an intermediate point for securing the pad in rolled position on the seat back for providing a cushion for the small of a user's back.

2. A head and back rest comprising: a frame, means for securing said frame on the back of a seat, a head support on the upper portion of the frame, a removable slip cover for the frame, said cover including an inverted pocket on its upper end for the reception of the head support for suspending the cover therefrom, a rollable pad on the lower end portion of the cover adapted to rest on the seat, a flap on the lower end of the cover underlying the pad, and means for detachably connecting the free end portion of said flap to the cover at an intermediate point for securing the pad in rolled position on the seat back for providing a cushion for the small of a user's back.

References Cited in the file of this patent

UNITED STATES PATENTS

| | | |
|---|---|---|
| 299,361 | Eiker | May 27, 1884 |
| 430,731 | Dobson | June 24, 1890 |
| 668,765 | Beach | Feb. 26, 1901 |
| 1,837,406 | Campbell | Dec. 22, 1931 |
| 2,020,573 | Pumphrey | Nov. 12, 1935 |
| 2,109,881 | Goldberg | Mar. 1, 1938 |
| 2,589,013 | Martin | Mar. 11, 1952 |
| 2,626,654 | Fout | Jan. 27, 1953 |
| 2,634,798 | Taylor | Apr. 14, 1953 |